US010839750B2

(12) United States Patent
Jung et al.

(10) Patent No.: US 10,839,750 B2
(45) Date of Patent: Nov. 17, 2020

(54) ELECTROSTATIC DISCHARGING CIRCUIT AND DISPLAY DEVICE INCLUDING THE SAME

(71) Applicant: SAMSUNG DISPLAY CO., LTD., Yongin-si (KR)

(72) Inventors: Mee-Hye Jung, Suwon-si (KR); Se-Hyoung Cho, Hwaseong-si (KR); Jang-Mi Kang, Seoul (KR); Kyung-Hoon Kim, Uiwang-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 261 days.

(21) Appl. No.: 15/418,125

(22) Filed: Jan. 27, 2017

(65) Prior Publication Data

US 2017/0221417 A1 Aug. 3, 2017

(30) Foreign Application Priority Data

Feb. 1, 2016 (KR) ........................ 10-2016-0012370

(51) Int. Cl.

*H02H 9/04* (2006.01)
*G09G 3/3258* (2016.01)
*G09G 3/36* (2006.01)

(52) U.S. Cl.

CPC ......... *G09G 3/3258* (2013.01); *G09G 3/3648* (2013.01); *G09G 2300/0426* (2013.01); *G09G 2310/08* (2013.01); *G09G 2330/04* (2013.01)

(58) Field of Classification Search

None

See application file for complete search history.

(56) References Cited

U.S. PATENT DOCUMENTS

2012/0268848 A1* 10/2012 Lin ........................ H02H 9/046 361/56
2014/0126093 A1* 5/2014 Duan ................ G02F 1/136204 361/56
2014/0126094 A1 5/2014 Duan et al.

* cited by examiner

*Primary Examiner* — Carl Adams
(74) *Attorney, Agent, or Firm* — F. Chau & Associates, LLC

(57) ABSTRACT

An electrostatic discharging circuit includes a first transistor including a first electrode electrically connected to a signal line, a second electrode receiving a first voltage, and a first gate electrode electrically connected to a first node. A second transistor includes a third electrode electrically connected to the signal line, a fourth electrode electrically connected to the first node, and a second gate electrode electrically connected to the first node. A first capacitor receives the first voltage and is electrically connected to the first node.

18 Claims, 5 Drawing Sheets

ELECTROSTATIC DISCHARGING CIRCUIT AND DISPLAY DEVICE INCLUDING THE SAME

CROSS-REFERENCE TO RELATED APPLICATION(S)

This application claims priority under 35 USC § 119 to Korean Patent Application No. 10-2016-0012370, filed on Feb. 1, 2016 in the Korean Intellectual Property Office (KIPO), the contents of which are incorporated by reference herein in its entirety.

TECHNICAL FIELD

The present disclosure relates to a display device, and more specifically, to an electrostatic discharging circuit and a display device including the electrostatic discharging circuit.

DISCUSSION OF THE RELATED ART

When static electricity or an overvoltage/overcurrent is generated at input pads or output pads of a display device, an electrostatic discharging circuit may prevent stress caused by the discharging of the static electricity or the overvoltage/overcurrent to a power terminal.

The display device may reduce a gap between pads (e.g., the input pads or the output pads) by discharging the static electricity using the electrostatic discharging circuit. The electrostatic discharging circuit is implemented as a relatively small transistor. However, because a transistor has either a negative threshold voltage or a positive threshold voltage, as determined by materials included within the transistor, a leakage of a signal (e.g., a leakage current), during the normal operation of the display device, may be caused by the electrostatic discharging circuit, particularly where a negative threshold voltage transistor is used.

SUMMARY

An electrostatic, discharging circuit includes a first transistor including a first electrode electrically connected to a signal line, a second electrode receiving a first voltage, and a first gate electrode electrically connected to a first node. A second transistor includes a third electrode electrically connected to the signal line, a fourth electrode electrically connected to the first node, and a second gate electrode electrically connected to the first node. A first capacitor receives the first voltage and is electrically connected to the first node.

A display panel includes a pixel, pad receiving a signal from an external source, a signal line transferring the signal to the pixel, and an electrostatic discharging circuit disposed adjacent to the pad. The electrostatic discharging circuit includes a first transistor including a first electrode electrically connected to the signal line, a second electrode receiving a first voltage, and a first gate electrode electrically connected to a first node, a second transistor including a third electrode electrically connected to the signal line, a fourth electrode electrically connected to the first node, and a second gate electrode electrically connected to the first node, and a first capacitor receiving the first voltage and electrically connected to the first node A display device includes a display panel including a pixel, a first pad, and a signal line electrically connecting the pixel and the first pad, a driving integrated circuit configured to receive a driving control signal through a second pad and configured to provide the display panel with a gate signal or a data signal, a timing controller configured to generate the driving control signal, and an electrostatic discharging circuit disposed adjacent to the first pad or the second pad. The electrostatic discharging circuit includes a first transistor including a first electrode electrically connected to the first pad or the second pad, a second electrode receiving a first voltage, and a first gate electrode electrically connected to a first node. A second transistor includes a third electrode electrically connected to the first pad or the second pad, a fourth electrode electrically connected to the first node, and a second gate electrode electrically connected to the first node. A first capacitor receives the first voltage and electrically connected to the first node.

A display device includes a display panel including a plurality of pixels, a data driver for providing data signals to the plurality of pixels, and a scan driver for providing scan signals to the plurality of pixels. The display panel, the data driver, or the scan driver includes a pad portion and the pad portion is connected to an electrostatic discharge circuit. The electrostatic discharge circuit includes a first transistor including a first electrode electrically connected to a signal line, a second electrode receiving a first voltage, and a first gate electrode electrically connected to a first node. A second transistor includes a third electrode electrically connected to the signal line, a fourth electrode electrically connected to the first node, and a second gate electrode electrically connected to the first node. A first capacitor receives the first voltage and is electrically connected to the first node.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EMBODIMENTS

Hereinafter, the present inventive concept will be explained in detail with reference to the accompanying drawings.

Figure 1:
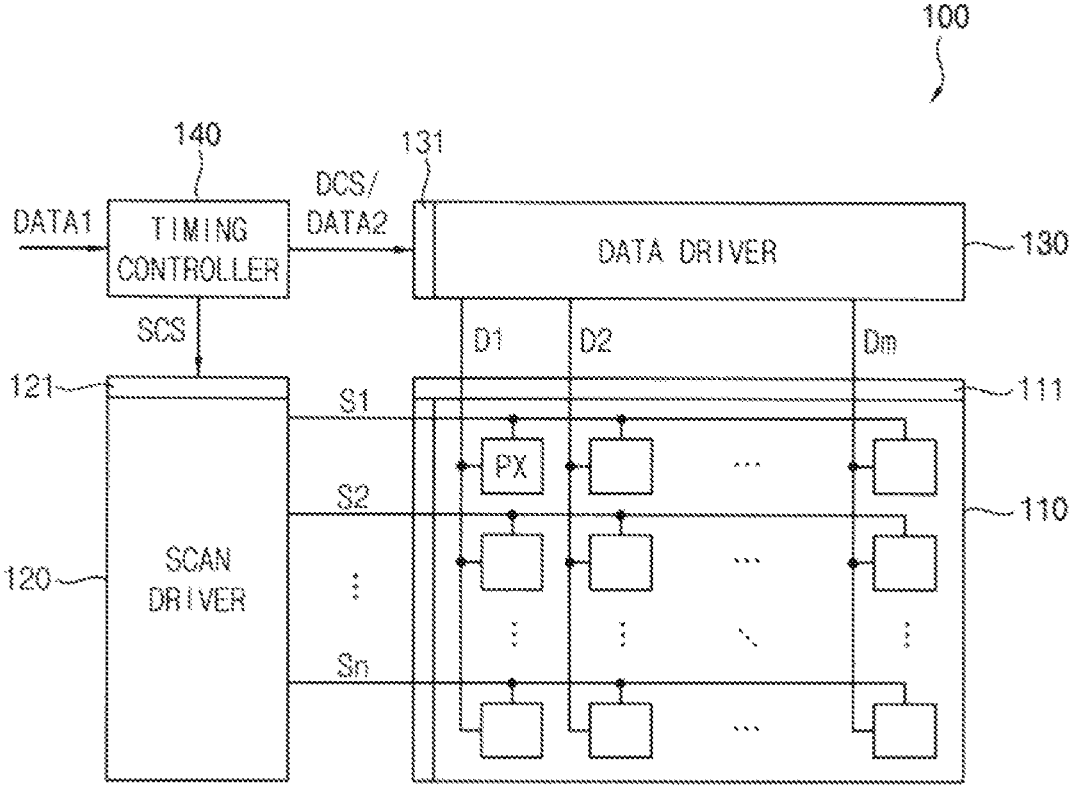
FIG. 1 is a block diagram illustrating a display device according to exemplary embodiments of the present invention.

FIG. 1 is a block diagram illustrating a display device according to exemplary embodiments of the present invention.

Referring to FIG. 1, the display device 100 may include a display panel 110, a scan driver 120, a data driver 130, and a timing controller 140. The display device 100 may display an image based on image data (e.g., first data DATA1) provided from an external source. For example, the display device 100 may be an organic light emitting display device.

The display panel 110 may include a first pad block 111, signal lines, and pixels PX. The first pad block 111 may receive signals (e.g., a scan signal and/or a data signal) provided from the external source (e.g., the scan driver 120 and/or the data driver 130). The signal lines may include scan lines S1 through Sn, where n is a positive integer, and data lines D1 through Dm, where in is a positive integer. Each pixel PX may be disposed in regions where the scan lines S1 through Sn cross the data lines D1 through Dm. The pixel PX may store a data signal (e.g., a data signal provided through the data lines D1 through Dm) in response to a scan signal (e.g., a scan signal provided through the scan lines S1 through Sn) and may emit lights based on a stored data signal.

In some exemplary embodiments of the present invention, the display panel 110 may include an electrostatic discharging circuit (e.g. a first electrostatic discharging circuit). Here, the electrostatic discharging circuit may be disposed adjacent to the first pad block 111 and may discharge static electricity (e.g. an electrostatic, an overvoltage, an overcurrent) generated at the first pad block 111 (e.g. a pad included in the first pad block 111) to a reference voltage. Here, the reference voltage may be a driving voltage of the display device 100, a ground voltage, or another voltage. The electrostatic discharging circuit may prevent (e.g. eliminate) stress of elements included in the display panel 110 (e.g., the pixel PX), where the stress is caused by the static electricity. A configuration of the electrostatic discharging circuit will be described in detail with reference to FIG. 1 and FIG. 2.

The scan driver 120 may generate the scan signal based on a scan driving control signal SCS. The scan driving control signal SCS may include a start pulse and clock signals. The scan driver 120 may include shift registers sequentially generating the scan signal based on the start pulse and the clock signals.

In some exemplary embodiments of the present invention, the scan driver 120 may include a second electrostatic discharging circuit. Similar to the electrostatic discharging circuit (e.g. the first electrostatic discharging circuit), the second electrostatic discharging circuit may be disposed adjacent to a second pad block 121 included in the scan driver 120 and may discharge static electricity (e.g. an electrostatic, an overvoltage, an overcurrent) generated at the second pad block 121 (e.g. a pad included in the second pad block 121) to a reference voltage.

The data driver 130 may generate the data signal in response to a data driving control signal DCS. The data driver 130 may convert image data of a digital format (e.g., second data DATA2) into a data signal of an analog format. The data driver 130 may generate a digital signal based on predetermined grayscale voltages (e.g. preset gamma voltages), where the grayscale voltages are provided from a gamma circuit to the data driver 130. The data driver 130 may provide the data signal to pixels included a particular pixel column.

In some exemplary embodiments of the present invention, the data driver 130 may include a third electrostatic discharging circuit. Similar to the second electrostatic discharging circuit, the third electrostatic discharging circuit may be disposed adjacent to a third pad block 131 included in the data driver 130 and may discharge static electricity (e.g. an electrostatic, an overvoltage, an overcurrent) generated at the third pad block 131 (e.g. a pad included in the second pad block 112) to a reference voltage.

The scan driver 120 and the data driver 130 may each be included in a driving integrated circuit.

The timing controller 140 may receive the image data (e.g., the first data DATA1) and input control signals (e.g., a horizontal synchronous signal, a vertical synchronous signal, and clock signals) from an external source and may generate a compensated image data (e.g., the second data DATA2) suitable to be displayed by the display panel 110. The timing controller 140 may control the scan driver 120 and the data driver 130. The timing controller 140 may generate the scan driving control signal SCS and the data driving control signal DCS based on the input control signals.

The display device 100 may further include a power supply. The power supply may generate a driving voltage to drive the display device 100 and may provide the driving voltage to the display panel 110 (e.g. to each of the pixels PX). Here, the driving voltage may be a power voltage required to drive the pixel PX, for example, the driving voltage may include a first power voltage ELVDD and a second power voltage ELVSS. The first power voltage ELVDD may be greater than the second power voltage ELVSS.

As described above, the display device 100, according to exemplary embodiments of the present invention, may include an electrostatic discharging circuit adjacent to pad blocks 111, 121, and 131 and may discharge static electricity (or an electrostatic, an overvoltage, an overcurrent) generated at the pad blocks 111, 121, and 131 (e.g. a pad included in the pad blocks 111, 121, and 131) using the electrostatic discharging circuit. Therefore, the display device 100 may prevent (e.g. eliminate) stress of an element caused by the static electricity.

Figure 2:
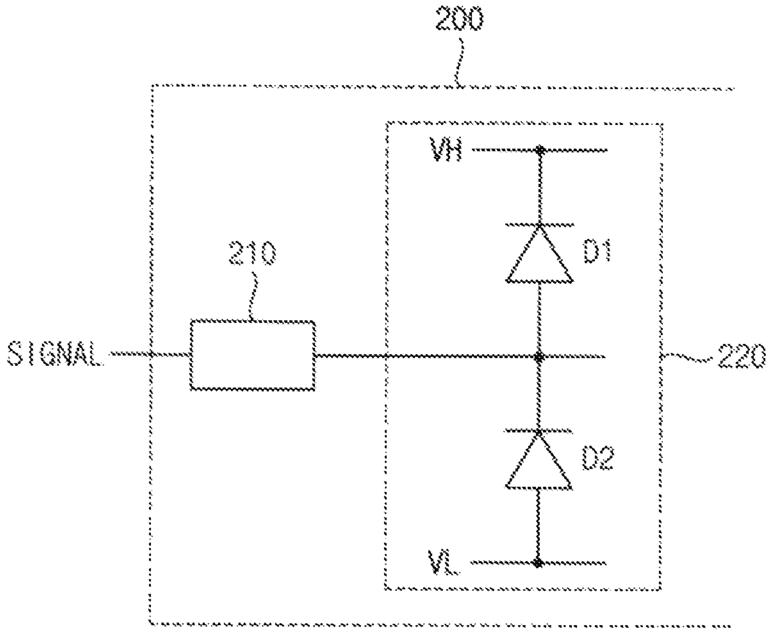
FIG. 2 is a block diagram illustrating an example of an electrostatic discharging circuit included in the display device of FIG. 1.

FIG. 2 is a block diagram illustrating an example of an electrostatic discharging circuit included in the display device of FIG. 1.

Referring to FIG. 2, the electrostatic discharging circuit 220 may be disposed adjacent to a pad 210 and may discharge static electricity (or an electrostatic, an overvoltage, an overcurrent) generated at the pad to a reference voltage. The electrostatic discharging circuit 220 may be included in a semiconductor circuit 200. For example, the semiconductor circuit 200 may be a display panel 110, or a driving integrated circuit (e.g., the scan driver 120 and/or the data driver 130).

The pad 210 may receive a signal SIGNAL provided from an external source and may transfer the signal SIGNAL through a signal line.

The electrostatic discharging circuit 220 may include a first clamping unit D1 and a second clamping unit D2. The first clamping unit D1 may be electrically connected between the signal line (e.g. the pad 210) and a first voltage VH and may discharge static electricity based on the first voltage VH when the static electricity is generated at the signal line (e.g. the pad 210). Here, the first voltage VH may be predetermined based on a normal range of the signal SIGNAL (e.g., a range in which the signal SIGNAL has a valid value). For example, the first voltage VH may be greater than or equal to a maximum value of the normal range.

For example, the first clamping unit D1 may clamp (e.g. limit) the signal SIGNAL based on the first voltage VH when the signal SIGNAL is greater than the first voltage VH. For example, the first clamping unit D1 may form an electrical connection between the signal line (e.g. the pad 210) and the first voltage VH and may output an overcurrent through the electrical connection to the first voltage VH.

Similarly, the second clamping unit D2 may be electrically connected between the signal line (e.g. the pad 210)

and a second voltage VL and may discharge static electricity based on the second voltage VL when the static electricity is generated at the signal line (e.g. the pad 210). Here, the second voltage VL may be predetermined based on the normal range of the signal SIGNAL. For example, the second voltage VL may be less than or equal to a minimum value of the normal range.

For example, the second clamping unit D2 may clamp (e.g. limit) the signal SIGNAL based on the second voltage VL when the signal SIGNAL is less than the second voltage VL. For example, the second clamping unit D2 may form an electrical connection between the signal line (e.g. the pad 210) and the second voltage VL and may reduce current from the second voltage VL through the electrical connection to the signal line.

As described with reference to FIG. 2, the electrostatic discharging circuit 220 may control (e.g. compensate) the signal SIGNAL based on the first voltage VH and/or the second voltage VL when the signal SIGNAL is out of the normal range of the signal SIGNAL. Therefore, the electrostatic discharging circuit 220 may prevent e.g. eliminate) the static electricity generated at the pad 210 (e.g. static electricity coming through the pad 210 or the signal line).

Figure 3:
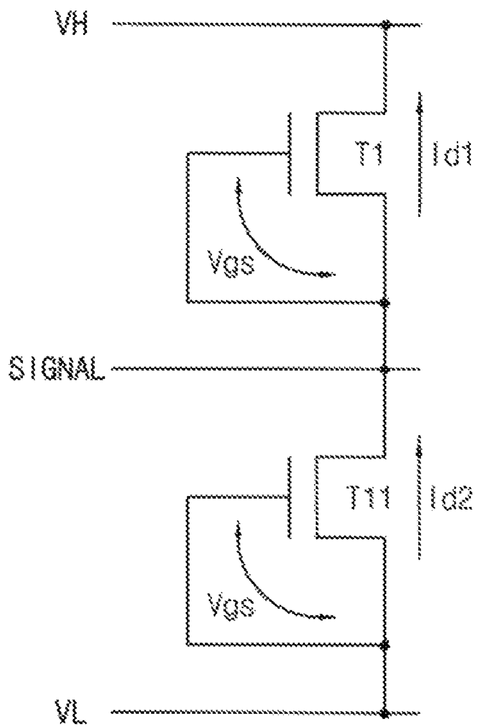
FIG. 3 is a circuit diagram illustrating a comparative example of the electrostatic discharging circuit of FIG. 2.
Figure 4:
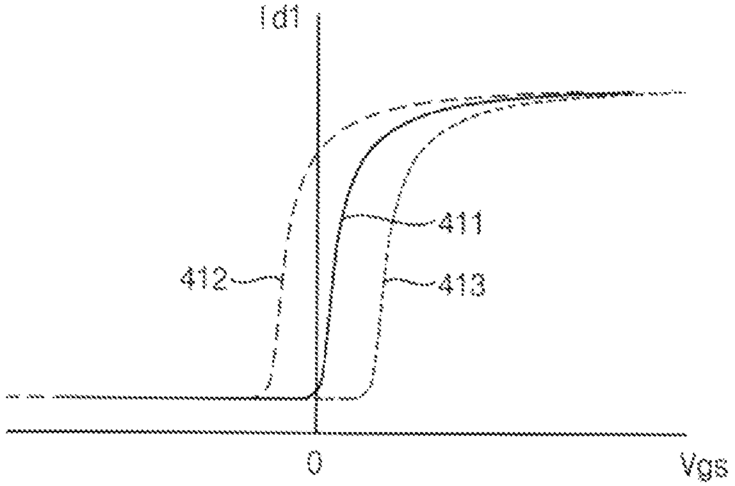
FIG. 4 is a diagram illustrating an operation characteristic of a transistor included in the electrostatic discharging circuit of FIG. 3.

FIG. 3 is a circuit diagram illustrating a comparative example of the electrostatic discharging circuit of FIG. 2. FIG. 4 is a diagram illustrating an operation characteristic of a transistor included in the electrostatic discharging circuit of FIG. 3.

Referring to FIGS. 2 and 3, the first clamping unit D1 may be implemented as a first transistor T1. The first transistor T1 may include a first electrode electrically connected to the signal line, a second electrode electrically connected to the first voltage VH, and a gate electrode electrically connected to the signal line. Here, the first electrode may be a source electrode, and the second electrode may be a drain electrode.

The first transistor T1 may form an electrical connection between the signal line and the first voltage VH based on a gate-source voltage Vgs. For example, when the signal SIGNAL provided through the signal line is greater than the first voltage VH, an overcurrent (e.g., a current exceeding a normal current) may flow through the first transistor to the first voltage VH.

The first transistor T1 may have a threshold voltage Vth and may operate abnormally as a result of a variation of the threshold voltage Vth of the first transistor T1.

Referring to FIG. 4, the first transistor T1 may have a positive threshold voltage (e.g., threshold voltage having a positive value) or a negative threshold voltage (e.g., a threshold voltage having a negative value) as a result of a characteristic of materials included in the first transistor T1 (e.g., a characteristic of an oxide).

A first operation characteristic curve 411 may represent an operation characteristic of the first transistor T1 having an ideal threshold voltage (e.g., 0 voltage (V)). According to the first operation characteristic curve 411, a first current Id1 flowing through the first transistor T1 may be about 0 milliampere (mA) when the gate-source voltage Vgs of the first transistor T1 is less than 0 V. For example, the first transistor T1 might not form the electrical connection when the gate-source voltage Vgs of the first transistor T1 is less than 0 V. The first current Id1 flowing through the first transistor T1 may have a certain value when the gate-source voltage Vgs of the first transistor T1 is greater than 0 V. For example, the first transistor T1 may form the electrical connection when the gate-source voltage Vgs of the first transistor T1 is greater than 0 V.

A second operation characteristic curve 412 may represent an operation characteristic of the first transistor T1 having a negative threshold voltage (e.g., a threshold voltage less than 0 V). According to the second operation characteristic curve 412, a first current Id1 flowing through the first transistor T1 may have a certain value when the gate-source voltage Vgs applied to the first transistor T1 is less than 0 V. Similarly, a third operation characteristic curve 413 may represent an operation characteristic of the first transistor T1 having a positive threshold voltage (e.g., a threshold voltage greater than 0 V). According to the third operation characteristic curve 413, a first current Id1 flowing through the first transistor T1 may be 0 mA When the gate-source voltage Vgs applied to the first transistor T1 is 0 V (or. greater than 0 V).

In addition, the first transistor T1 may be degraded over time, and the threshold voltage Vth may be shifted to a positive direction (e.g., to have more positive value) or to a negative direction (e.g., to have more negative value). For example, the first transistor T1 may have an operation characteristic according to the first operation characteristic curve 411, but the operation characteristic may be changed to be the same as or similar to an operation characteristic according to the second operation characteristic curve 412 or according to third operation characteristic curve 413 over time. In this case, the first transistor T1 might not perform an electrostatic discharging function.

Referring again to FIG. 3, the second clamping unit D2 may be implemented as a second transistor T2. The second transistor T2 may include a first electrode electrically connected to the second voltage VL, a second electrode electrically connected to the signal line, and a gate electrode electrically connected to the second voltage VL. Here, the first electrode may be a source electrode, and the second electrode may be a drain electrode.

Similar to the first transistor T1, the second transistor T2 may form an electrical connection between the signal line and the second voltage VL based on the gate-source voltage Vgs. For example, a lack of current may be provided from the second voltage VL through the electrical connection to the signal line when the signal SIGNAL provided through the signal line is less than the second voltage VL.

Similar to the first transistor T1, the second transistor T2 may have a threshold voltage Vth, and the threshold voltage may have a positive value or a negative value. In addition, the threshold voltage Vth of the second transistor T2 may be shifted to the positive direction or to the negative direction over time. Here, the second transistor T2 might not perform (e.g. may perform abnormally) an electrostatic discharging function.

As described with reference to FIGS. 3 and 4, an electrostatic discharging circuit implemented as a transistor (e.g., the first transistor T1 or the second transistor T2) might not perform (e.g. may perform abnormally) an electrostatic discharging function because the threshold voltage Vth of the transistor is variable and shifted over time.

Even though the threshold voltage Vth has a negative value or has shifted to the negative direction, the electrostatic discharging circuit 220, according to exemplary embodiments of the present invention, may perform the electrostatic discharging function in a stable manner by compensating the threshold voltage Vth of a transistor (e.g., the first transistor T1 and the second transistor T2) included therein.

Figure 5:
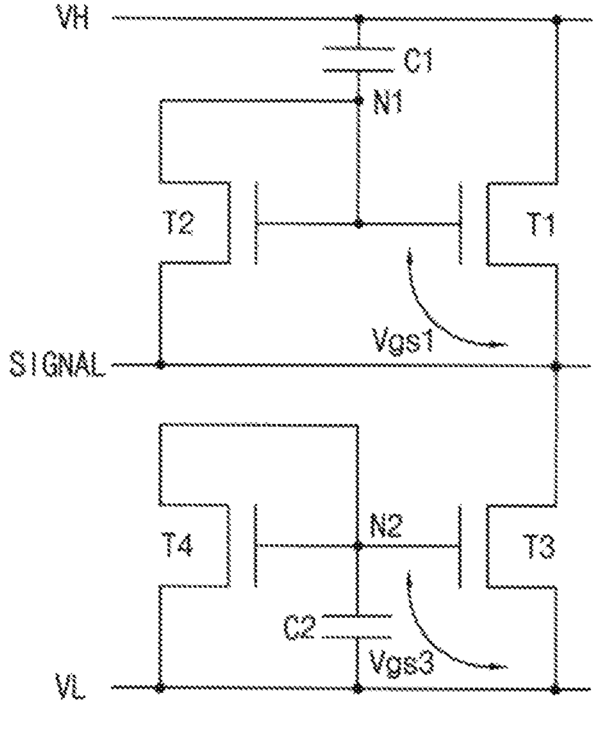
FIGS. 5 through 7 are diagrams illustrating an example of the electrostatic discharging circuit of FIG. 2.
Figure 6:
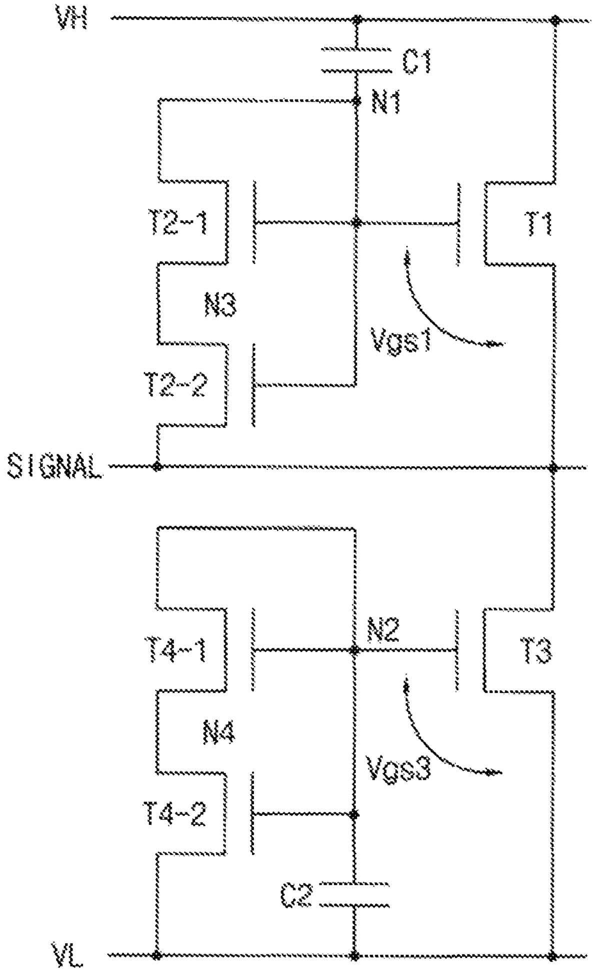
Figure 7:
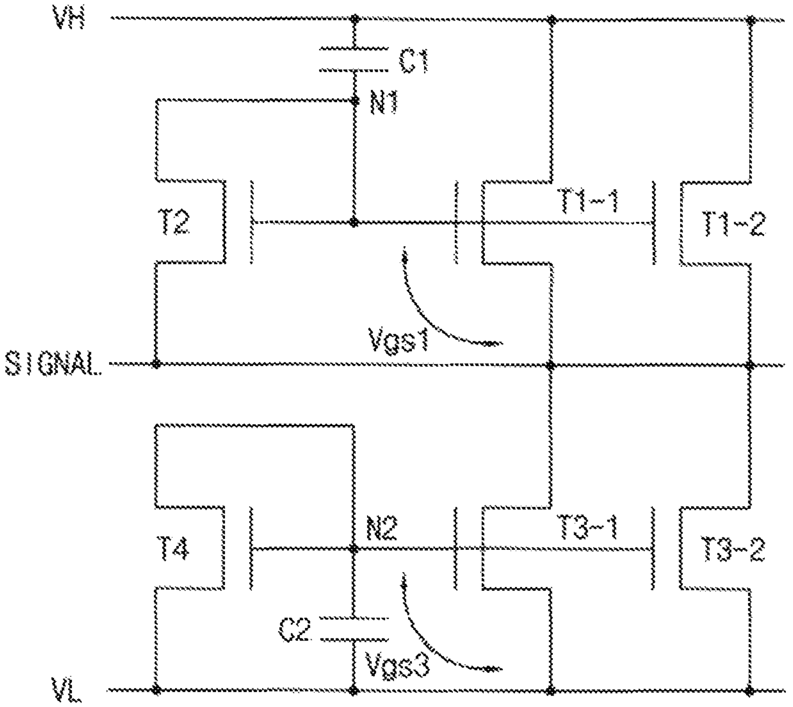

FIGS. 5 through 7 are diagrams illustrating an example of the electrostatic discharging circuit of FIG. 2.

Referring to FIGS. 2 and 5, the electrostatic discharging circuit 220 (e.g. the first clamping unit D1) may include a first transistor T1, a second transistor T2, and a first capacitor C1.

The first transistor T1 may include a first electrode electrically connected to the signal line, a second electrode electrically connected to the first voltage VH, and a gate electrode electrically connected to a first node N1. Here, the first electrode may be a source electrode, and the second electrode may be a drain electrode. The first transistor T1 may form an electrical connection between the signal line and the first voltage VH based on a first node voltage at the first node N1.

The second transistor T2 may include a first electrode electrically connected to the signal line, a second electrode electrically connected to the first node N1, and a gate electrode electrically connected to the first node N1. The second transistor T2 may form an electrical connection between the signal line and the first node N1 based on the first node voltage at the first node N1.

The first capacitor C1 may be electrically connected between the first node N1 and the first voltage VH and may store a current (e.g., an electron) transferred through the second transistor T2.

The first node voltage at the first node N1 may be greater than the signal SIGNAL by a second threshold voltage Vth2 of the second transistor T2 (e.g., V_N1=SIGNAL+Vth2, where V_N1 is the first node voltage) according to the second threshold voltage Vth2 of the second transistor T2. The first capacitor C1 may maintain the first node voltage at the first node N1.

A first current flowing through the first transistor T1 may be proportional to a voltage difference between a first gate-source voltage Vgs1 of the first transistor T1 and a first threshold voltage Vth1 of the first transistor T1 (e.g. proportional to a square of the voltage difference). Here, the first gate-source voltage Vgs1 of the first transistor T1 may be a voltage difference between the first node voltage at the first node N1 and the signal SIGNAL, for example, the first gate-source voltage Vgs1 may be equal to the second threshold voltage Vth2 (e.g., Vgs1=V_N1−SIGNAL=SIGNAL+Vth2−SIGNAL=Vth2). Therefore, the first current flowing through the first transistor T1 may be proportional to a voltage difference between the first threshold voltage Vth of the first transistor T1 and the second threshold voltage Vth2 of the second transistor T2 (e.g. proportional to a square of the voltage difference).

The second threshold voltage Vth2 of the second transistor T2 may be equal to or similar to the first threshold voltage Vth1 of the first transistor T1 because the second transistor T2 is disposed adjacent to the first transistor T1. Here, the first transistor T1 may be operated according to the first operation characteristic curve 411 described above with reference to FIG. 4. For example, even though the first transistor T1 has the threshold voltage Vth having a negative value, the first transistor T1 (e.g. the first clamping unit D1 including the first transistor T1) may be operated according to the first operation characteristic curve 411 because the first gate-source voltage Vgs1 of the first transistor T1 is compensated by the second threshold voltage Vth2 of the second transistor T2.

In some exemplary embodiments of the present invention, the second threshold voltage Vth2 of the second transistor T2 may be greater than the first threshold voltage Vth1 of the first transistor T1. Here, the first transistor T1 (e.g. the first clamping unit D1 including the first transistor T1) may be operated according to the third operation characteristic curve 413 illustrated in FIG. 4 even though the first transistor T1 and the second transistor T2 have threshold voltages having a negative value.

For example, a second channel of the second transistor T2 may be longer than a first channel of the first transistor T1. Here, the second threshold voltage Vth2 of the second transistor T2 may be greater than the first threshold voltage Vth1 of the first transistor T1. Because a threshold voltage increases as a length of a channel increases.

Referring to FIG. 6, the second transistor T2 may include a first sub transistor T2-1 and a second sub transistor T2-2. Here, the first sub transistor T2-1 may be substantially the same as each of the second sub transistor T2-2 and the first transistor T1. For example, a channel (e.g. a length and a width of a channel) of the first sub transistor T2-1 may be substantially the same as (e.g. equal to) a channel (e.g. a length and a width of a channel) of the second sub transistor 12-2. In addition, the channel of the first sub transistor T2-1 may be substantially the same as (e.g. equal to) a channel of the first transistor T1.

The first sub transistor T2-1 and the second sub transistor T2-2 may be electrically connected in series between the first node N1 and the signal line. The first sub transistor T2-1 may include a first electrode electrically connected to a third node N3, a second electrode electrically connected to the first node N1, and a gate electrode electrically connected to the first node N1. The second sub transistor 12-2 may include a first electrode electrically connected to the signal line, a second electrode electrically connected to the third node N3, and a gate electrode electrically connected to the first node N1. The first sub transistor T2-1 and the second sub transistor T2-2 may form an electrical connection based on the first node voltage at the first node N1. A total length of a total channel of the first sub transistor T2-1 and the second sub transistor T2-2 may be two times a length of a first channel of the first transistor T1.

For example, the second channel of the second transistor T2 may be narrower than the first channel of the first transistor T1. Here, the second threshold voltage Vth2 of the second transistor T2 may be greater than the first threshold voltage Vth1 of the first transistor T1. Because a threshold voltage decreases as a width of a channel increases.

Referring to FIG. 7, the first transistor T1 may include a first auxiliary transistor T1-1 (e.g. a third sub transistor) and a second auxiliary transistor T1-2 (e.g. a fourth sub transistor). The first auxiliary transistor T1-1 and the second auxiliary transistor T1-2 may be electrically connected in parallel. Each of the first auxiliary transistor T1-1 and the second auxiliary transistor T1-2 may be the same as or substantially the same as the first transistor T1 illustrated in FIG. 5. The first auxiliary transistor T1-1 may a first electrode electrically connected to the data line, a second electrode electrically connected to the first voltage VH, and a gate electrode electrically connected to the first node N1. Similar to the first auxiliary transistor T1-1, the second auxiliary transistor T1-2 may a first electrode electrically connected to the data line, a second electrode electrically connected to the first voltage VH, and a gate electrode electrically connected to the first node N1. The first auxiliary transistor T1-1 and the second auxiliary transistor T1-2 may form an electrical connection based on the first node voltage at the first node N1, and a width of a total channel of the first auxiliary transistor T1-1 and the second auxiliary transistor T1-2 may be two times (e.g. twice) a width of the second channel of the second transistor T2.

As described above, the electrostatic discharging circuit 220 may include the second transistor T2 having the second threshold voltage Vth2 which is greater than the first threshold voltage Vth1 of the first transistor T1. Therefore, the electrostatic discharging circuit 220 (e.g. the first transistor T1, the first clamping unit D1) may perform the electrostatic discharging function according to the third operation characteristic curve 413 illustrated in FIG. 4, even though the first transistor T1 has the threshold voltage Vth having a negative value.

Referring again to FIG. 5, the electrostatic discharging circuit 220 (e.g. the second clamping unit D2) may include a third transistor T3, a fourth transistor T4, and a second capacitor C2.

The third transistor T3 may include a first electrode electrically connected to the second voltage VL, a second electrode electrically connected to the signal line, and a gate electrode electrically connected to a second node N2. Here, the first electrode may be a source electrode, and the second electrode may be a drain electrode. The third transistor T3 may form an electrical connection between the signal line and the second voltage VL based on a second node voltage at the second node N2.

The fourth transistor T4 may include a first electrode electrically connected to the second voltage VL, a second electrode electrically connected to the second node N2, and a gate electrode electrically connected to a second node N2. The fourth transistor T4 may form an electrical connection between the signal line and the second voltage VL based on the second node voltage at the second node N2.

The second capacitor C2 may be electrically connected between the second node N2 and the second voltage VL and may store a current transferred through the fourth transistor T4.

The second node voltage at the second node N2 may be greater than the second voltage VL by a fourth threshold voltage Vth4 of the fourth transistor T4 (e.g., V_N2=VL+Vth4, where V_N1 is the first node voltage) according to the fourth threshold voltage Vth4 of the fourth transistor T4. The second capacitor C2 may maintain the second node voltage at the second node N2.

A third current flowing through the third transistor T3 may be proportional to a voltage difference between a third gate-source voltage Vgs3 of the third transistor T3 and a third threshold voltage Vth3 of the third transistor T3 (e.g. proportional to a square of the voltage difference). Here, the third gate-source voltage Vgs3 of the third transistor T3 may be a voltage difference between the second node voltage at the second node N2 and the second voltage VL, for example, the third gate-source voltage Vgs3 may be equal to the second third threshold voltage Vth4 (e.g., Vgs3=V_N2−VL=VL+Vth4−VL=Vth4).

The fourth threshold voltage Vth4 of the fourth transistor T4 may be equal to or similar to the third threshold voltage Vth3 of the third transistor T3 because the fourth transistor T4 is disposed adjacent to the third transistor T3. Here, the third transistor T3 may be operated according to the first operation characteristic curve 411 described with reference to FIG. 4. For example, even though the third transistor T3 has a threshold voltage having a negative value, the third transistor T3 (e.g. the second clamping unit D2 including the third transistor T3) may be operated according to the first operation characteristic curve 411 because the third gate-source voltage Vgs3 of the third transistor T3 is compensated by the fourth threshold voltage Vth4 of the fourth transistor T4.

As described with reference to FIG. 5, the electrostatic discharging circuit 220 according to exemplary embodiments of the present invention may compensate a threshold voltage of a main transistor (e.g., the first transistor T1 or the third transistor T3) which forms an electrical connection using an auxiliary transistor (e.g., the second transistor T2 or the fourth transistor T4). Therefore, the electrostatic discharging circuit 220 may perform the electrostatic discharging function in a stable manner even though the threshold voltage Vth of the main transistor has a negative value or has shifted to the negative direction.

In some exemplary embodiments of the present invention, the fourth threshold voltage Vth4 of the fourth transistor T4 may be greater than the third threshold voltage Vth3 of the third transistor T3. Here, the third transistor T3 (e.g. the second clamping unit D2 including the third transistor T3) may be operated according to the third operation characteristic curve 413 illustrated in FIG. 4 even though the third transistor T3 and the fourth transistor T4 have threshold voltages having a negative value.

For example, a fourth channel of the fourth transistor T4 may be longer than a third channel of the third transistor T3.

Referring to FIG. 6, the fourth transistor T4 may include a first sub transistor T4-1 and a second sub transistor T4-2. The first sub transistor T4-1 and the second sub trannsistor T4-2 may be electrically connected in series between the second node N2 and the second voltage VL. The first sub transistor T4-1 may include a first electrode electrically connected to a fourth node N4, a second electrode electrically connected to the second node N2, and a gate electrode electrically connected to the second node N2. The second sub transistor T4-2 may include a first electrode electrically connected to the second voltage, a second electrode electrically connected to the fourth node N4, and a gate electrode electrically connected to the second node N2.

For example, the fourth channel of the fourth transistor T4 may be narrower than the third channel of the third transistor T3.

Referring to FIG. 7, the third transistor T3 may include a first auxiliary transistor T3-1 (e.g. a third sub transistor) and a second auxiliary transistor T3-2 (e.g. a fourth sub transistor). The first auxiliary transistor T3-1 and the second auxiliary transistor T3-2 may be electrically connected in parallel between the signal line and the second voltage VL. The first auxiliary transistor T3-1 may include a first electrode electrically connected to the second voltage VL, a second electrode electrically connected to the data line, and a gate electrode electrically connected to the second node N2. Similar to the first auxiliary transistor T3-1, the second auxiliary transistor T3-2 may include a first electrode electrically connected to the second voltage VL, a second electrode electrically connected to the data line, and a gate electrode electrically connected to the second node N2.

As described above, the electrostatic discharging circuit 220 may include the fourth transistor T4 having the fourth threshold voltage Vth4 which is greater than the third threshold voltage Vth3 of the third transistor T3. Therefore, the electrostatic discharging circuit 220 (e.g. the third transistor T3, the second clamping unit D2) may perform the electrostatic discharging function according to the third operation characteristic curve 413 illustrated in FIG. 4, even though the third transistor T3 and the fourth transistor T4 have threshold voltages having a negative value.

The present inventive concept may be applied to any display device (e.g., an organic light emitting display device, a liquid crystal display device, etc). For example, the present inventive concept may be applied to a television, a computer monitor, a laptop, a digital camera, a cellular phone, a smart phone, a personal digital assistant (PDA), a portable multimedia player (PMP), an MP3 player, a navigation guidance system, a video phone, etc. The foregoing is illustrative of exemplary embodiments of the present invention, and is not to be construed as limiting thereof. Although a few exemplary embodiments of the present invention have been described, those skilled in the art will readily appreciate that many modifications are possible without materially departing from the novel teachings and aspects of the present disclosure.

What is claimed is:

1. An electrostatic discharging circuit comprising:
a first transistor including a first electrode electrically connected to a signal line, a second electrode receiving a first voltage that is different from a signal provided through the signal line, and a first gate electrode electrically and directly connected to a first node;
a second transistor including a third electrode electrically connected to the signal line, a fourth electrode electrically and directly connected to the first node, and a second gate electrode electrically and directly connected to the first node; and
a first capacitor including a first electrode electrically and directly connected to the first voltage and a second electrode electrically and directly connected to the first node,
wherein the first transistor clamps the signal based on the first voltage.

2. The electrostatic discharging circuit of claim 1, wherein the first capacitor stores a second threshold voltage of the second transistor.

3. The electrostatic discharging circuit of claim 1, wherein a second threshold voltage of the second transistor is greater than a first threshold voltage of the first transistor.

4. The electrostatic discharging circuit of claim 1, wherein a length of a second channel of the second transistor is longer than a length of a first channel of the first transistor.

5. The electrostatic discharging circuit of claim 1, wherein the second transistor includes:
a first sub transistor including a fifth electrode electrically connected to a third node, a sixth electrode electrically connected to the first node, and a third gate electrode electrically connected to the first node; and
a second sub transistor including a seventh electrode electrically connected to the signal line, an eighth electrode electrically connected to the third node, and a fourth gate electrode electrically connected to the first node.

6. The electrostatic discharging circuit of claim 1, wherein a width of a second channel of the second transistor is narrower than a width of a first channel of the first transistor.

7. The electrostatic discharging circuit of claim 1, wherein the first transistor includes:
a first auxiliary transistor including a ninth electrode electrically connected to the signal line, a tenth electrode receiving the first voltage, and a fifth gate electrode electrically connected to the first node; and
a second auxiliary transistor including an eleventh electrode electrically connected to the signal line, a twelfth electrode receiving the first voltage, and a sixth gate electrode electrically connected to the first node.

8. The electrostatic discharging circuit of claim 1, further comprising:
a third transistor including a thirteenth electrode electrically connected to a second voltage that is different from the signal, a fourteenth electrode electrically connected to the signal line, and a seventh gate electrode electrically connected to a second node;
a fourth transistor including a fifteenth electrode electrically connected to the second voltage, a sixteenth electrode electrically connected to the second node, and an eighth gate electrode electrically connected to the second node; and
a second capacitor including a first electrode electrically and directly connected to the second voltage and a second electrode electrically and directly connected to the second node,
wherein the third transistor clamps the signal based on the second voltage.

9. The electrostatic discharging circuit of claim 8, wherein the second capacitor stores, a fourth threshold voltage of the fourth transistor.

10. The electrostatic discharging circuit of claim 8, wherein a voltage level of the first voltage is higher than a voltage level of the second voltage.

11. The electrostatic discharging circuit of claim 8, wherein a fourth channel of the fourth transistor is longer than a third channel of the third transistor.

12. The electrostatic discharging circuit of claim 8, wherein the fourth transistor includes:
a third sub transistor including a seventeenth electrode electrically connected to a fourth node, an eighteenth electrode electrically connected to the second node, and a ninth gate electrode electrically connected to the second node; and
a fourth sub transistor including a nineteenth electrode electrically connected to the second voltage, a twentieth electrode electrically connected to the fourth node, and a tenth gate electrode electrically connected to the second node.

13. The electrostatic discharging circuit of claim 8, wherein, a fourth channel of the fourth transistor is narrower than a third channel of the third transistor.

14. The electrostatic discharging circuit of claim 8, wherein the third transistor includes:
a third auxiliary transistor including a twenty-first electrode receiving the second voltage, a twenty-second electrode electrically connected to the signal line, and an eleventh gate electrode electrically connected to the second node; and
a fourth auxiliary transistor including a twenty-third electrode receiving the second voltage, a twenty-fourth electrode electrically connected to the signal line, and a twelfth gate electrode electrically connected to the second node.

15. A display panel comprising:
a pixel:
a pad receiving a signal from an external source;
a signal line transferring the signal to the pixel; and
an electrostatic discharging circuit disposed adjacent to the pad,
wherein the electrostatic discharging circuit includes:
a first transistor including a first electrode electrically connected to the signal line, a second electrode receiving a first voltage that is different from the signal, and a first gate electrode electrically and directly connected to a first node;
a second transistor including, a third electrode electrically connected to the signal line, a fourth electrode electrically and directly connected to the first node, and a second gate electrode electrically and directly connected to the first node; and a first capacitor including a first electrode electrically and directly connected to the first voltage and a second electrode electrically and directly connected to the first node, wherein the first transistor clamps the signal based on the first voltage.

16. The display panel of claim 15, wherein the electrostatic discharging circuit further includes:

a third transistor including a fifth electrode receiving a second voltage that is different from the signal, a sixth electrode electrically connected to the signal line, and a third gate electrode electrically connected to a second node;

a fourth transistor including a seventh electrode receiving the second voltage, an eighth electrode electrically connected to the second node, and a fourth gate electrode electrically connected to the second node; and a second capacitor including a first electrode electrically and directly connected to the second voltage and a second electrode electrically and directly connected to the second node, wherein the third transistor clamps the signal based on the second voltage.

17. A display device comprising:

a display panel including a pixel, a first pad, and a signal line electrically connecting the pixel and the first pad;

a driving integrated circuit configured to receive a driving control signal through a second pad and configured to provide the display panel with a gate signal or a data signal;

a timing controller configured to generate the driving control signal; and an electrostatic discharging circuit disposed adjacent to the first pad or the second pad, wherein the electrostatic discharging circuit includes:

a first transistor including a first electrode electrically connected to the first pad or the second pad, a second electrode receiving a first voltage that is different from a signal provided to the first pad or the second pad, and a first gate electrode electrically and directly connected to a first node;

a second transistor including a third electrode electrically connected to the first pad or the second pad, a fourth electrode electrically and directly connected to the first node, and a second gate electrode electrically and directly connected to the first node; and a first capacitor including a first electrode electrically and directly connected to the first voltage and a second electrode electrically and directly connected to the first node, wherein the first transistor clamps the signal based on the first voltage.

18. The display device of claim 17, wherein the electrostatic discharging circuit further includes:

a third transistor including a fifth electrode receiving a second voltage that is different from the signal, a sixth electrode electrically connected to the first pad or the second pad, and a third gate electrode electrically connected to a second node;

a fourth transistor including a seventh electrode receiving the second voltage, an eighth electrode electrically connected to the second node, and a third gate electrode electrically connected to the second node; and a second capacitor including a first electrode, electrically and directly connected to the second voltage and a second electrode electrically and directly connected to the second node, wherein the third transistor clamps the signal based on the second voltage.

* * * * *